(12) United States Patent
Kuriki et al.

(10) Patent No.: US 9,350,044 B2
(45) Date of Patent: May 24, 2016

(54) LITHIUM SECONDARY BATTERY AND MANUFACTURING METHOD THEREOF

(75) Inventors: Kazutaka Kuriki, Kanagawa (JP); Nobuhiro Inoue, Kanagawa (JP); Kai Kimura, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 27 days.

(21) Appl. No.: 13/604,675

(22) Filed: Sep. 6, 2012

(65) Prior Publication Data

US 2013/0067726 A1    Mar. 21, 2013

(30) Foreign Application Priority Data

Sep. 20, 2011    (JP) ................................ 2011-205100

(51) Int. Cl.
| | | |
|---|---|---|
| *H01M 10/04* | (2006.01) | |
| *H01M 10/052* | (2010.01) | |
| *H01M 10/058* | (2010.01) | |
| *H01M 10/44* | (2006.01) | |

(52) U.S. Cl.
CPC .......... *H01M 10/052* (2013.01); *H01M 10/058* (2013.01); *H01M 10/446* (2013.01); *H01M 2220/30* (2013.01); *Y02E 60/122* (2013.01); *Y02P 70/54* (2015.11); *Y10T 29/49108* (2015.01)

(58) Field of Classification Search
CPC .. H01M 10/058; H01M 10/446; H01M 4/386
USPC ........................................................ 29/623.1
See application file for complete search history.

(56) References Cited

U.S. PATENT DOCUMENTS

| | | | |
|---|---|---|---|
| 4,764,853 | A | 8/1988 | Thomas et al. |
| 6,134,902 | A | 10/2000 | Curry |

(Continued)

FOREIGN PATENT DOCUMENTS

| | | |
|---|---|---|
| CN | 101180761 | 5/2008 |
| CN | 102227835 | 10/2011 |

(Continued)

OTHER PUBLICATIONS

International Search Report (Application No. PCT/JP2012/073001; PCT15824) Dated Dec. 4, 2012.

(Continued)

*Primary Examiner* — Nicholas P D'Aniello
(74) *Attorney, Agent, or Firm* — Nixon Peabody LLP; Jeffrey L. Costellia

(57) ABSTRACT

An object is to improve the cycle performance by improving the reactivity between lithium and a negative electrode active material in the case where an alloy-based material such as silicon is used as the negative electrode active material. A method of manufacturing a lithium secondary battery including a positive electrode including a positive electrode active material into/from which lithium can be inserted/extracted, a negative electrode including a negative electrode active material into/from which lithium can be inserted/extracted, and an electrolyte solution is provided. The method includes the steps of electrochemically inserting lithium into the negative electrode with use of a counter electrode before the lithium secondary battery is assembled, electrochemically extracting part of the lithium inserted into the negative electrode after the insertion, and assembling the lithium secondary after the extraction.

25 Claims, 10 Drawing Sheets

(56) References Cited

U.S. PATENT DOCUMENTS

| | | |
|---|---|---|
| 7,179,561 B2 | 2/2007 | Niu et al. |
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 2005/0079423 A1* | 4/2005 | Matsubara et al. ...... 429/231.95 |
| 2007/0295718 A1 | 12/2007 | Takei et al. |
| 2008/0254296 A1 | 10/2008 | Handa et al. |
| 2008/0261112 A1* | 10/2008 | Nagata et al. .............. 429/218.1 |
| 2009/0045680 A1 | 2/2009 | Litch et al. |
| 2009/0070988 A1 | 3/2009 | Honda et al. |
| 2009/0123850 A1 | 5/2009 | Takeuchi et al. |
| 2010/0035093 A1* | 2/2010 | Ruoff et al. ..................... 429/12 |
| 2010/0081057 A1 | 4/2010 | Liu et al. |
| 2010/0143798 A1 | 6/2010 | Zhamu et al. |
| 2010/0176337 A1 | 7/2010 | Zhamu et al. |
| 2010/0248034 A1 | 9/2010 | Oki et al. |
| 2010/0310941 A1* | 12/2010 | Kumta et al. ............ 429/231.95 |
| 2010/0330421 A1* | 12/2010 | Cui et al. ...................... 429/217 |
| 2011/0012067 A1 | 1/2011 | Kay |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2011/0244328 A1 | 10/2011 | Iriyama et al. |
| 2011/0291240 A1 | 12/2011 | Yamazaki |
| 2011/0292564 A1 | 12/2011 | Yamazaki |
| 2012/0171542 A1 | 7/2012 | Matsumoto et al. |
| 2013/0017443 A1 | 1/2013 | Yamazaki |

FOREIGN PATENT DOCUMENTS

| | | |
|---|---|---|
| EP | 2 369 659 A1 | 9/2011 |
| JP | 08-255635 | 10/1996 |
| JP | 10-223259 | 8/1998 |
| JP | 2002-093411 | 3/2002 |
| JP | 2006-190556 | 7/2006 |
| JP | 2006-216451 | 8/2006 |
| JP | 2006-324020 | 11/2006 |
| JP | 2008-098155 | 4/2008 |
| JP | 2008-269827 A | 11/2008 |
| JP | 2009-076372 | 4/2009 |
| WO | WO-2006/123450 A1 | 11/2006 |
| WO | WO-2010/071166 A1 | 6/2010 |
| WO | WO-2011/030686 | 3/2011 |

OTHER PUBLICATIONS

Written Opinion (Application No. PCT/JP2012/073001; PCT15824) Dated Dec. 4, 2012.

* cited by examiner

LITHIUM SECONDARY BATTERY AND MANUFACTURING METHOD THEREOF

TECHNICAL FIELD

The present invention relates to a lithium secondary battery and a manufacturing method thereof, specifically relates to a lithium secondary battery with less irreversible capacity in an initial period of charge-discharge cycles.

BACKGROUND ART

In recent years, with the advance of environmental technology, power generation devices (e.g., solar power generation devices) which pose less burden on the environment than conventional power generation methods have been actively developed. Concurrently with the development of power generation technology, development of power storage devices has also been underway.

As an example of power storage devices, a lithium secondary battery that is a secondary battery is given. A lithium secondary battery is widely spread because the lithium secondary battery has high energy density and is well suited for miniaturization. As an electrode material of a lithium secondary battery, a material in/from which lithium can be inserted/extracted is preferably used. Examples of the electrode material include a carbon-based material such as graphite and an alloy-based material such as silicon or silicon oxide. Among alloy-based materials, silicon-based active material is particularly expected to be a host material of lithium because the theoretical capacity of silicon is about ten times as high as that of graphite.

However, even in a lithium secondary battery in which a carbon-based material such as graphite or an alloy-based material such as silicon is used for a negative electrode active material, it is extremely difficult to extract all lithium introduced at charge from a positive electrode material such as $LiFePO_4$, $LiCoO_2$, or $LiMn_2O_4$ into the alloy-based material of the negative electrode active material is extracted at discharge. Accordingly, there is a problem in that a certain amount of lithium remains in the alloy-based material. In other words, there is a problem in that lithium is used for irreversible capacity, resulting in a decrease in discharge capacity of the secondary battery and a decrease in performance as a battery.

In order to solve such a problem, many researches have been conducted, and patent documents have reported on such researches (e.g., see Patent Documents 1 to 3). For example, Patent Document 1 discloses a lithium secondary battery formed in such a manner that a carbon material for a negative electrode is doped with a lithium-containing metal oxide for a positive electrode after the battery is assembled, and the positive electrode is doped with lithium provided in the battery. In this lithium secondary battery, a lithium metal and the positive electrode are connected through a resistive element, and the resistive element controls current flowing between the lithium metal and the positive electrode; thus, after the assembling of the battery, the positive electrode is doped with lithium by the electrochemical connection.

Patent Document 2 discloses a lithium secondary battery which includes a positive electrode formed with lithium manganese oxide serving as a positive electrode active material, and a negative electrode formed with a carbon material serving as a negative electrode active material. According to Patent Document 2, metal lithium is put in a battery can in advance; an electrolyte solution is added to cause short circuit between the metal lithium and the positive electrode, so that lithium corresponding to irreversible capacity of the negative electrode is introduced into the positive electrode; and then initial charge is performed between the positive electrode and the negative electrode. By this method, lithium ions transfer from the metal lithium to the positive electrode, and from the positive electrode to the negative electrode, so that the negative electrode is doped with the lithium ions. Consequently, the negative electrode can be doped with lithium, which corresponds to irreversible capacity.

Patent Document 3 discloses a negative electrode formed in such a manner that lithium insertion treatment is performed on a negative electrode material formed of silicon with an ion implantation apparatus in advance.

REFERENCE

Patent Document

[Patent Document 1]
Japanese Published Patent Application No. H08-255635
[Patent Document 2]
Japanese Published Patent Application No. H10-223259
[Patent Document 3]
Japanese Published Patent Application No. 2002-93411

DISCLOSURE OF INVENTION

The conventional methods disclosed in Patent Documents 1 and 2, however, have a purpose of supplying lithium to a negative electrode including a carbon-based material and silicon are used as active materials, and do not change the reactivity of these active materials. Therefore, cycle deterioration has not been significantly prevented. Particularly in the case where silicon is used as the active material, the operating potential range is limited, so that high capacity, which is the nature of the silicon negative electrode, has been sacrificed. In addition, the conventional methods have problems as follows: lithium remains at the surface of the negative electrode; a process of manufacturing a lithium secondary battery is complicated; and the like. In the method of implanting lithium ions in advance, which is disclosed in Patent Document 3, sufficient effect of preventing the deterioration cannot be obtained because the concentration of lithium implanted is low. In addition, the method is highly difficult from the point of achieving a device structure.

In view of the above, an object of one embodiment of the present invention is to improve the cycle performance by improving the reactivity between lithium and a negative electrode active material in the case where an alloy-based material such as silicon is used as the negative electrode active material. Another object is to provide a lithium secondary battery capable of maintaining high capacity without sacrificing high capacity, which is the nature of the negative electrode formed of the alloy-based material. Another object is to provide a lithium secondary battery including a negative electrode at the surface of which lithium does not remain. Another object is to fabricate a lithium secondary battery without using an additional apparatus such as a lithium ion implantation apparatus and complicating a manufacturing apparatus and a manufacturing process.

One embodiment of the present invention is a method of manufacturing a lithium secondary battery including a positive electrode including a positive electrode active material into/from which lithium can be inserted/extracted, a negative electrode including a negative electrode active material into/from which lithium can be inserted/extracted, and an electrolyte solution. The method includes the steps of electrochemically inserting lithium into the negative electrode with use of a counter electrode before the lithium secondary battery is assembled, electrochemically extracting part of the lithium inserted into the negative electrode after the insertion, and assembling the lithium secondary after the extraction.

In particular, in the insertion of lithium into the negative electrode which is performed before the battery is assembled, it is preferable that the amount of lithium inserted into the negative electrode active material for forming the negative electrode be the approximately maximum amount.

In the extraction of part of lithium which is performed after the insertion of lithium into the negative electrode and before the assembling of the battery, it is preferable that lithium corresponding to 9% or greater of the maximum amount of lithium capable of being inserted into the negative electrode (total capacity) be made to remain. The amount of lithium remaining can be greater than or equal to 9% and less than or equal to 43% of the total capacity.

In the insertion of lithium into the negative electrode, when a charge-discharge rate is set at 0.2 C, the insertion is preferably performed such that a potential difference between the negative electrode and the counter electrode is greater than or equal to 0.03 V and less than or equal to 0.2 V.

According to one embodiment of the present invention, lithium can be supplied to a negative electrode in advance, and the cycle deterioration of a lithium secondary battery can be prevented by changing the reactivity between lithium and the negative electrode active material in the fabrication of the battery.

As described above, the cycle deterioration can be prevented while the capacity of the negative electrode formed of an alloy-based material is kept. In particular, use of silicon as the negative electrode active material makes it possible to prevent the cycle deterioration while high capacity, which is the nature of the silicon negative electrode, is maintained.

According to one embodiment of the present invention, lithium does not remain at the surface of a negative electrode, which is different from the conventional methods; thus, the reliability of a lithium secondary battery can be improved.

According to one embodiment of the present invention, an additional apparatus such as a lithium ion implantation apparatus is not needed, so that a lithium secondary battery can be fabricated without complicating a manufacturing apparatus and a manufacturing process.

Hereinafter, embodiments will be described. The embodiments can be implemented in many different modes. It will be readily appreciated by those skilled in the art that modes and details can be changed in various ways without departing from the spirit and scope of the present invention. Therefore, the present invention should not be interpreted as being limited to the following description of the embodiments.

EMBODIMENT 1

In this embodiment, electrochemical aging treatment is described.

Figure 1:
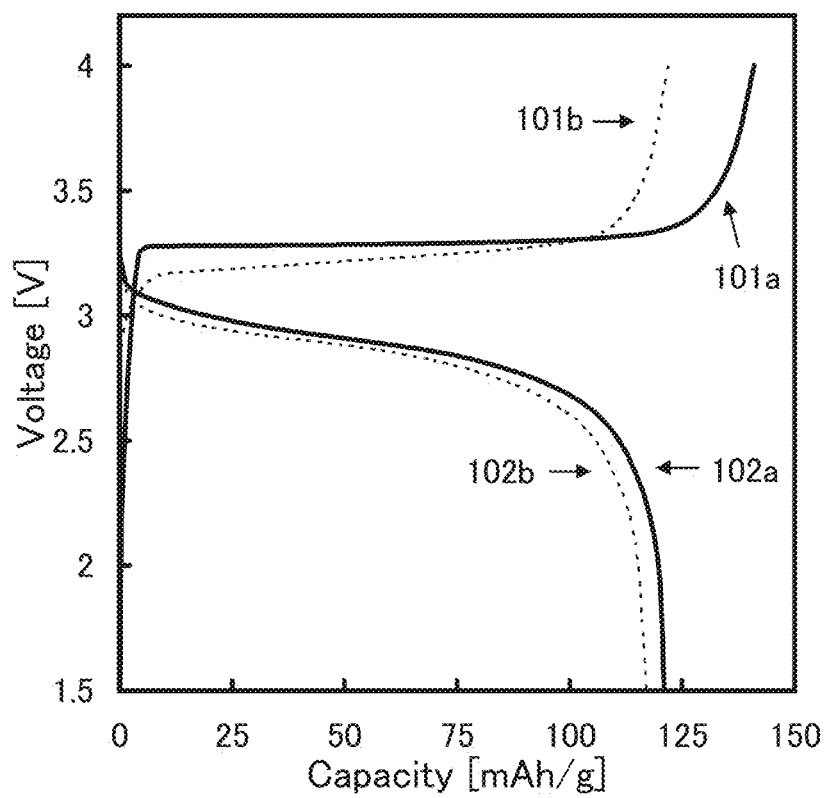
FIG. 1 shows charge and discharge curves of a full cell including a silicon negative electrode.

FIG. 1 shows the charge-discharge characteristics of a lithium secondary battery in which silicon is used as a negative electrode active material. A full cell having a structure in which an electrolyte solution is provided between a positive electrode and a negative electrode was formed and the characteristics thereof were measured. In the graph, four curves 101a, 102a, 101b, and 102b show change in voltage at the first charge, the first discharge, the second charge, and the second discharge, respectively. The capacity at the first discharge is significantly lower than that at the first charge. Accordingly, the coulombic efficiency at the first cycle is low. Furthermore, the capacity at the second charge is lower than that at the first charge. Similarly, the capacity at the second discharge is lower than that at the first discharge. Therefore, the capacity gradually decreases with an increase in charge-discharge cycles.

Figure 2:
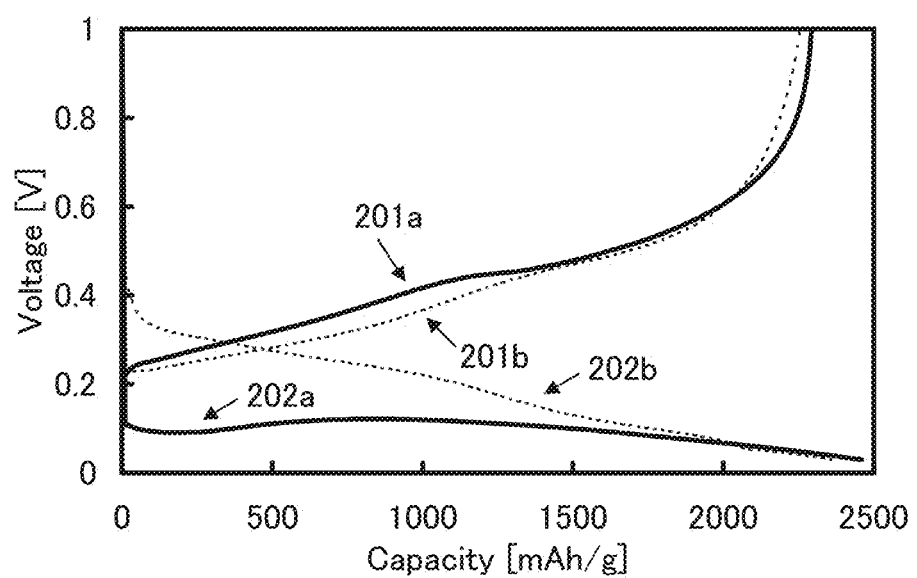
FIG. 2 shows charge and discharge curves of a half cell including a silicon negative electrode.

FIG. 2 shows the charge-discharge characteristics of a lithium secondary battery in which silicon is used as a negative electrode active material. A half cell was formed and the characteristics thereof were measured. In the measurement of the half cell, silicon serving as the negative electrode active material was used for a positive electrode, and metal lithium was used for a negative electrode. It should be noted that in the case of the half cell having the electrode formed of metal lithium, the electrode formed of the silicon active material corresponds to a positive electrode.

In FIG. 2, four curves 201a, 202a, 201b, and 202b show change in voltage at the first charge, the first discharge, the second charge, and the second discharge, respectively. The charge and discharge curves at the first charge-discharge cycle greatly differ from those at the second charge-discharge cycle. In other words, the curve 202a showing the first discharge rapidly falls and the capacity is not formed while the sharp decline, which means that irreversible capacity is formed on the positive electrode (the electrode formed of the silicon active material) side. That is, an electrolyte solution is decomposed by reaction between lithium and the silicon active material, and a film is formed at the surface of the electrode, for which charging current is consumed. In addition, at this time, the silicon active material and lithium do not react sufficiently, and lithium is trapped to remain in silicon, which brings a decrease in discharge capacity. Thus, the state of the silicon active material is probably changed by the first charge and discharge.

When a full cell is formed using a negative electrode which is not subjected to electrochemical aging treatment in this embodiment, deteriorations of a positive electrode and an electrolyte solution are accelerated. In general, a negative electrode is formed to have a larger area or higher capacity than a positive electrode. Accordingly, the negative electrode not subjected to electrochemical aging treatment becomes a significant factor of deterioration.

In view of the above, in this embodiment, by performing electrochemical treatment (hereinafter referred to as electrochemical aging treatment) on the negative electrode active material before a battery is assembled, a film is formed in advance and reactivity between lithium and an alloy-based material for forming the negative electrode is improved; therefore, insertion/extraction of lithium into/from the negative electrode formed of the alloy-based material is facilitated.

Figure 3:
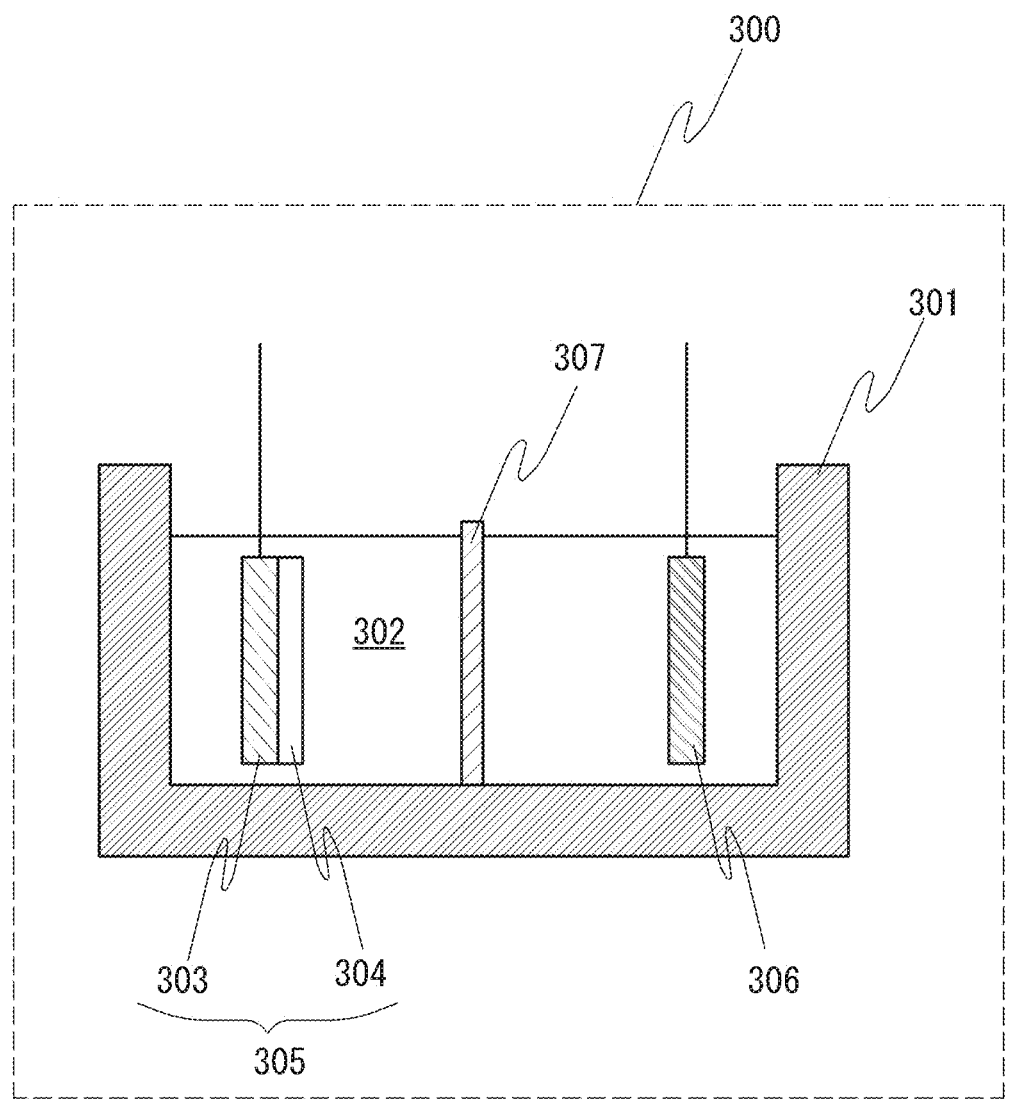
FIG. 3 is a cross-sectional view of a cell for electrochemical aging treatment.

First, a cell used for electrochemical aging treatment (hereinafter referred to as cell for aging) is formed by combination of an electrode formed of an alloy-based material and a counter electrode. The cell for aging is described with reference to FIG. 3. FIG. 3 is a cross-sectional view of the cell for aging. A cell for aging 300 includes a container 301, an electrolyte solution 302 in the container, an electrode 305 which is an object of aging, a counter electrode 306, and a separator 307. The electrode 305 includes at least a current collector 303 and an active material layer 304 formed on the current collector 303. The electrode 305 is to be subjected to the electrochemical aging treatment and used as a negative electrode of a lithium secondary battery. The electrode 305 and the counter electrode 306, which are submerged in the electrolyte solution, are separated by the separator. A terminal of each of the electrode 305 and the counter electrode 306 is drawn out of the cell for aging 300. By application of voltage to both the terminals, lithium ions are inserted into or extracted from the electrode 305.

A material into/from which lithium ions can be inserted/extracted is used for the active material layer 304. For example, a silicon-based active material such as silicon or silicon oxide or an alloy-based material such as a tin-based active material can be used. Although the current collector 303 is shown in FIG. 3, the active material layer 304 alone may be used as the electrode 305 without using the current collector 303. The theoretical lithium occlusion capacity of silicon is significantly larger than that of graphite. When the occlusion capacity is large, charge and discharge can be performed sufficiently even in a small area and a function as a negative electrode can be obtained; therefore, cost reduction and miniaturization of a secondary battery can be achieved. Note that since silicon or the like swells approximately four times its volume due to occlusion of lithium, a structure with a mechanism of releaving or suppressing the expansion is preferably employed.

A material having high conductivity can be used for the current collector 303; for example, metal such as stainless steel, gold, platinum, zinc, iron, copper, tin, nickel, niobium, tantalum, tungsten, or titanium or an alloy thereof can be used. The current collector 303 may have a foil shape, a plate (sheet) shape, a net shape, a punched metal shape, an expanded metal shape, or the like, as appropriate.

The counter electrode 306 is used for insertion/extraction of lithium into/from an alloy-based material. For example, metal lithium can be used for the counter electrode 306.

The electrolyte solution 302 is a nonaqueous solution containing an electrolyte or a solution containing an electrolyte. Examples of the electrolyte include lithium salt such as $LiClO_4$, $LiAsF_6$, $LiBF_4$, $LiPF_6$, or $Li(C_2F_5SO_2)_2N$.

The electrolyte solution 302 is preferably a nonaqueous solution containing an electrolyte. That is, an aprotic organic solvent is preferably used as a solvent of the electrolyte solution 302. Examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. Alternatively, as the aprotic organic solvent, one ionic liquid or a plurality of ionic liquids may be used. Owing to non-flammability and non-volatility of an ionic liquid, it is possible to prevent explosion, inflammation, and the like of the cell for aging 300 at the time when the internal temperature of the cell for aging 300 rises, resulting in safety of aging treatment.

When a gelled high-molecular material containing an electrolyte is used as the electrolyte solution 302, safety against liquid leakage and the like is improved. Examples of the gelled high-molecular material include a silicon gel, an acrylic gel, an acrylonitrile gel, polyethylene oxide, polypropylene oxide, and a fluorine-based polymer.

As the electrolyte solution 302, a solid electrolyte such as $Li_3PO_4$ can be used.

As the separator 307, an insulating porous material is used. For example, paper; nonwoven fabric; a glass fiber; ceramics; or a synthetic fiber such as nylon (polyamide), vinylon (polyvinyl alcohol based fiber), polyester, acrylic, polyolefin, polyurethane, polyethylene, or polypropylene may be used. Note that a material that does not dissolve in the electrolyte solution 302 should be selected.

Next, insertion/extraction of lithium into/from the alloy-based material for forming the negative electrode is performed by electrochemical reaction of the aging treatment.

For the aging treatment, lithium is inserted/extracted into/from the electrode 305 by application of voltage between the electrode 305 and the counter electrode 306. First, lithium is supplied from the counter electrode to the electrode 305, and the lithium is inserted into the active material layer 304. The amount of lithium to be inserted can be the maximum amount of lithium capable of being inserted into the active material layer 304. Here, the maximum amount of lithium capable of being inserted includes an approximate value of the maximum amount, and does not refer to the theoretical maximum amount of lithium to be inserted. An object of the aging treatment is to improve reactivity between lithium and the alloy-based material for forming the active material layer; accordingly, the amount of lithium to be inserted is not necessarily limited to the maximum amount. Specifically, it is preferable to insert lithium corresponding to about 7% or higher of the total capacity.

After the insertion of lithium into the active material layer 304, the lithium is extracted from the active material layer 304. However, part of the lithium inserted into the active material layer 304 cannot be extracted. This is probably because lithium is used to form a film and improve the reactivity between lithium and the alloy-based material for forming the active material layer 304. That is, lithium for forming irreversible capacity cannot be extracted. Therefore, here, at least lithium for forming irreversible capacity is made to remain and the other lithium is extracted. Specifically, it is preferable that lithium corresponding to 9% or higher of the total capacity be made to remain and the other lithium be extracted. It is more preferable that lithium corresponding to approximately greater than or equal to 9% and less than or equal to 43% of the total capacity be made to remain and the other lithium be extracted.

The electrochemical aging treatment is preferably performed at a charge-discharge rate of 0.2 C; however, this embodiment is not limited thereto.

After the aging treatment, the cell for aging is disassembled, and the electrode 305 subjected to the electrochemical aging treatment and a positive electrode are combinated to assemble a lithium secondary battery.

Figure 4:
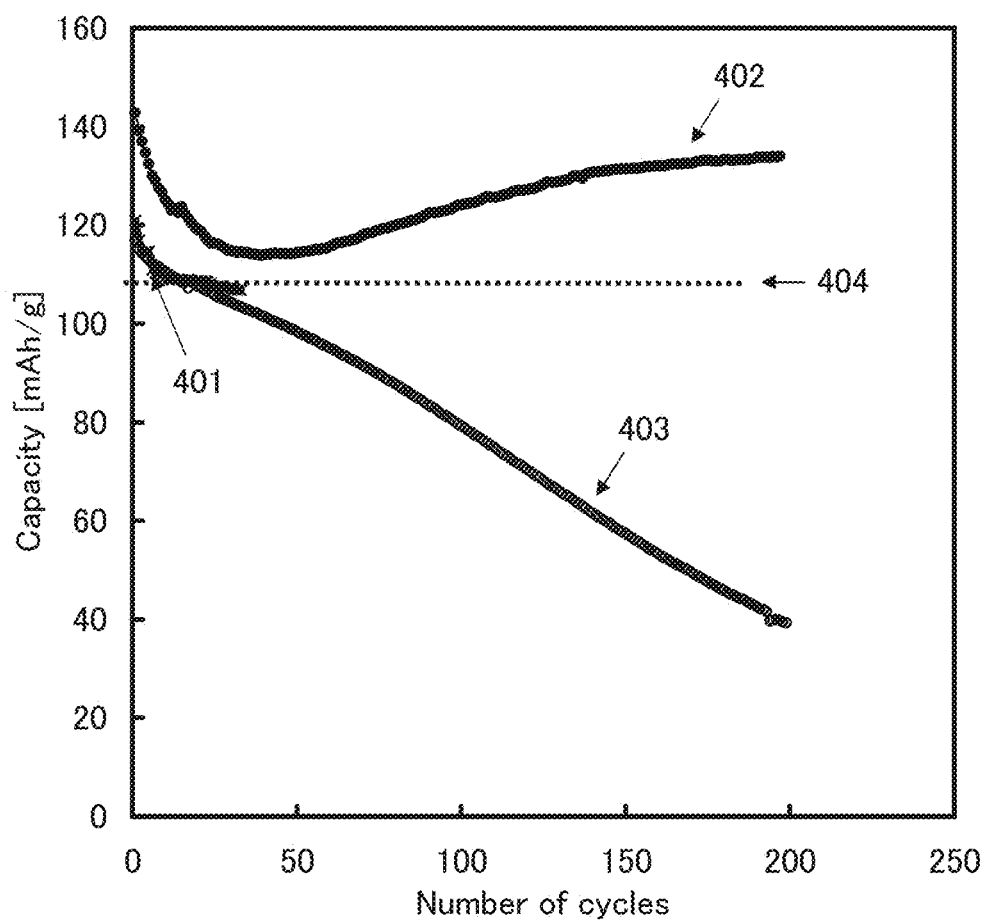
FIG. 4 shows cycle performance.

FIG. 4 shows the cycle performance of the lithium secondary battery subjected to the electrochemical aging treatment described in this embodiment. The horizontal axis indicates the number of cyclic charge and discharge (the number of cycles), and the vertical axis indicates change in capacity (mAh/g) relative to the number of cycles. As a comparative example, a curve 401 shows the cycle performance of a lithium secondary battery which is not subjected to any aging treatment. In this case, it is clear that the capacity decreases with an increase in the number of cycles. In the 50th cycle, deterioration goes on.

A curve 402 shows measurement result of the cycle performance of a lithium secondary battery which is subjected to the aging treatment. At the beginning of the cycles, the capacity is 140 mAh/g, which is high as compared to the lithium secondary battery which is not subjected to the aging treatment, whose capacity is about 120 mAh/g. In FIG. 4, a dotted line 404 laterally crossing the graph shows a 20% reduction from the initial capacity of the lithium secondary battery which is subjected to the aging treatment. As for the lithium secondary battery which is subjected to the aging treatment, although the capacity decreases in the initial period of the cycles, the capacity does not decrease by 20% or higher of the initial capacity, and there in no great change in the capacity with an increase in the number of cycles. The capacity is almost stable, and slightly increases with the increase in the number of cycles.

A curve 403 shows the cycle performance of a lithium secondary battery in which lithium corresponding to a capacity of about 0.1 mAh, i.e., the irreversible capacity is electrochemically inserted into an electrode in advance. It is clear that the discharge capacity significantly decreases with an increase in the number of cycles. This result shows that only insertion of lithium corresponding to the irreversible capacity into the negative electrode in advance cannot prevent the cycle deterioration.

Accordingly, only when the electrochemical aging treatment described in Embodiment 1 is performed as appropriate, the cycle deterioration can be prevented. Therefore, in the case where an alloy-based material such as silicon is used as the negative electrode active material, lithium is inserted into or extracted from the active material layer in advance, so that the reactivity between lithium and the alloy-based material can be improved. Consequently, a lithium secondary battery capable of maintaining high capacity can be provided without sacrificing high capacity, which is the nature of the negative electrode formed of the alloy-based material. Further, a lithium secondary battery in which lithium does not remain at the surface of a negative electrode can be provided, which is different from a lithium secondary battery fabricated by the conventional method. Furthermore, according to one embodiment of the present invention, an additional apparatus such as a lithium ion implantation apparatus is not needed, so that a lithium secondary battery can be fabricated without complicating a manufacturing apparatus and a manufacturing process.

EMBODIMENT 2

Next, a method of forming the electrode 305 that is one embodiment of the present invention and described in Embodiment 1 is described with reference to FIG. 3. In particular, the case where silicon is used as an alloy-based material for the active material layer 304 is described in this embodiment.

The active material layer 304 including a plurality of whisker-like (hair-like, string-like, or fiber-like) portions. The whisker-like active material is preferably composed of a crystalline core and an amorphous outer shell. The amorphous outer shell has resistance to change in volume due to occlusion and release of ions (e.g., relieves stress caused by change in volume). In addition, the crystalline core, which has excellent conductivity and ion mobility, has a characteristic in that the rate of occluding ions and the rate of releasing ions are high per unit mass. Thus, when a plurality of whisker-like active materials, each of which is composed of the core and the outer shell, is used for the electrode 305, charge and discharge can be performed at high speed; accordingly, a lithium secondary battery whose charge/discharge capacity and cycle performance are improved can be fabricated.

First, as the active material layer 304, a silicon layer is formed on the current collector 303 by a thermal CVD method, preferably an LPCVD method. Thus, an electrode including the current collector 303 and the active material layer 304 is formed.

The current collector 303 functions as a current collector of the electrode. Thus, a conductive material having a foil shape, a plate shape, or a net shape is used. The current collector 303 may be formed using, without particular limitation, a metal element with high conductivity typified by titanium, platinum, aluminum, or copper. Note that in the case of using aluminum for the current collector, an aluminum alloy to which an element that improves heat resistance such as silicon, titanium, neodymium, scandium, or molybdenum is added is preferably used. Alternatively, the current collector 303 may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel.

The active material layer 304 provided on the current collector 303 includes a plurality of whisker-like portions. A material of the whisker-like active materials is not particularly limited to silicon as long as the material can form a plurality of whisker-like active materials and occlude and release ions. In this embodiment, a manufacturing method in which silicon is used as the material is described.

The plurality of whisker-like active materials can be formed by an LPCVD (low pressure CVD) method. Here, the plurality of whisker-like active materials is preferably formed at a temperature higher than 400° C. and lower than or equal to a temperature at which an LPCVD apparatus and the current collector 303 can withstand, and preferably higher than or equal to 500° C. and lower than 580° C.

In the case where the plurality of whisker-like active materials is formed, as a source gas, a deposition gas containing silicon is used. Examples of the deposition gas containing silicon include a gas containing silicon hydride, silicon fluoride, and silicon chloride. Specifically, $SiH_4$, $Si_2H_6$, $SiF_4$, $SiCl_4$, $Si_2Cl_6$, or the like can be used. Note that one or more of a hydrogen gas and rare gases such as helium, neon, argon, and xenon may be contained in the source gas.

Furthermore, in the formation of the plurality of whisker-like active materials, the pressure is set to be higher than or equal to 10 Pa and lower than or equal to 1000 Pa, preferably higher than or equal to 20 Pa and lower than or equal to 200 Pa.

Further, when the flow rate of the deposition gas containing silicon is high, the deposition rate becomes high, so that silicon of the active material layer is likely to have an amorphous structure. When the flow rate of the deposition gas containing silicon is low, the deposition rate becomes low, so that silicon of the active material layer is likely to have a crystalline structure. Thus, the flow rate of the deposition gas containing silicon may be appropriately determined in consideration of the deposition rate and the like. For example, the flow rate of the deposition gas containing silicon may be greater than or equal to 300 sccm and less than or equal to 1000 sccm.

When the source gas contains phosphine or diborane, the plurality of whisker-like active materials can contain an impurity element imparting one conductivity type (e.g., phosphorus or boron). When the plurality of whisker-like active materials contains an impurity element imparting one conductivity type, the conductivity of the electrode 305 can be increased, so that a lithium secondary battery in which charge/discharge capacity is increased can be manufactured.

With the LPCVD method, ions and electrons transfer easily at the interface between the current collector 303 and the active material layer 304, and the adhesion can be increased. In addition, throughput can be improved.

Next, graphene which is in contact the plurality of whisker-like active materials is formed. Here, graphene means single-layer graphene or multilayer graphene including 2 to 100 sheets of graphene. The single-layer graphene refers to a one-atom-thick sheet of carbon molecules having π bonds. In the electrode 305, even if the whisker-like active material changes its volume due to occlusion and release of ions, the graphene relieves stress caused by the change in volume, so that the structure of the electrode is not easily damaged; for example, pulverization and separation of the whisker-like active materials are less likely to occur. Therefore, the cycle performance can be improved. Furthermore, graphene which has high conductivity (high electron mobility) is provided between the plurality of whisker-like active materials, so that the electrode 305 can have excellent electric characteristics.

Graphene can be formed by an oxidation method called Hummers method or a dip coating method; however, an electrophoresis method is preferably used in the case where an active material layer having a complex curved surface or projections and depressions such as the active material layer including a plurality of whisker-like active materials is provided with the graphene oxide.

In the electrophoresis method, an object (active material layer including a plurality of whisker-like active materials) is provided in a container filled with a solution in which the obtained graphene oxide is dispersed; the object is used as an anode; a conductive material such as a metal material or an alloy material is used as a cathode; and appropriate voltage (e.g., 5 V to 20 V) is applied between the anode and the cathode. As a result, a graphene oxide layer is formed over a surface of the object, that is, the surface of the active material layer including a plurality of whisker-like active materials. This is because a variety of functional groups from which hydrogen ions are detached is bonded to the graphene oxide, so that the graphene oxide is negatively charged in a polar solvent. By the application of voltage, the graphene oxide negatively charged is drawn to the anode and attached to the object. When graphene oxide with a required thickness is obtained, the object is taken out of the graphene oxide solution and dried.

Time for performing electrophoresis (time for applying voltage) is preferably longer than time until the surface of the object is covered with the graphene oxide. For example, the time for performing electrophoresis may be longer than or equal to 0.5 minutes and shorter than or equal to 30 minutes, preferably longer than or equal to 5 minutes and shorter than or equal to 20 minutes.

Then, part of oxygen is released from the formed graphene oxide by reduction treatment. As the reduction treatment, the graphene oxide is heated at 150° C. or higher, preferably 200° C. or higher in a vacuum or in a reducing atmosphere such as an inert gas (nitrogen, a rare gas, or the like) atmosphere. By being heated at a higher temperature and for a longer time, graphene oxide is reduced to a higher extent so that graphene with high purity (i.e., with a low concentration of elements other than carbon) can be obtained. The temperature for heating has to be determined in consideration of reactivity between the graphene oxide and the object. Note that graphene oxide is known to be reduced at 150° C.

Through the above reduction treatment, the formed graphene oxide becomes graphene. At this time, in the graphene, adjacent graphene oxides are bonded to form a larger net-like or sheet-like network. Therefore, in the plane view of the active material layer, the graphene spreads continuously over a plurality of whisker-like active materials. In other words, the graphene spreads uniformly in the planar direction of the active material layer (the plurality of whisker-like active materials) and is in contact with the plurality of whisker-like active materials.

Through the above steps, the active material layer 304 can be fabricated. In the above manner, an electrode of a lithium secondary battery with good cycle performance and high charge/discharge capacity can be manufactured. In particular, the active material layer formed of silicon described in this embodiment is subjected to the electrochemical aging treatment described in Embodiment 1, so that the reactivity between silicon and lithium is improved; consequently, a high-capacity lithium secondary battery in which deterioration in cycle performance is prevented can be fabricated.

Note that this embodiment can be implemented in combination with any of the structures described in the other embodiments, as appropriate.

EMBODIMENT 3

In this embodiment, a power storage device on which the electrode described in Embodiment 1 or 2 is mounted is described.

A power storage device described in this embodiment includes at least a positive electrode, a negative electrode, a separator, and an electrolyte solution. The electrode subjected to the aging treatment described in Embodiment 1 is used as the negative electrode.

The electrolyte solution is a nonaqueous solution containing an electrolyte or a solution containing an electrolyte. Any electrolyte can be used as the electrolyte as long as it contains carrier ions such as alkali metal ions, alkaline earth metal ions, beryllium ions, or magnesium ions. Examples of the alkali metal ions include lithium ions, sodium ions, and potassium ions. Examples of the alkaline earth metal ions include calcium ions, strontium ions, and barium ions. In this embodiment, an electrolyte containing lithium ions (hereinafter referred to as a lithium-containing electrolyte) is used as the electrolyte.

With the above structure, a lithium-ion secondary battery or a lithium-ion capacitor can be formed. In addition, an electric double layer capacitor can be formed by using only a solvent for the electrolyte without using an electrolyte.

Here, a lithium-ion secondary battery is described with reference to drawings.

Figure 5A:
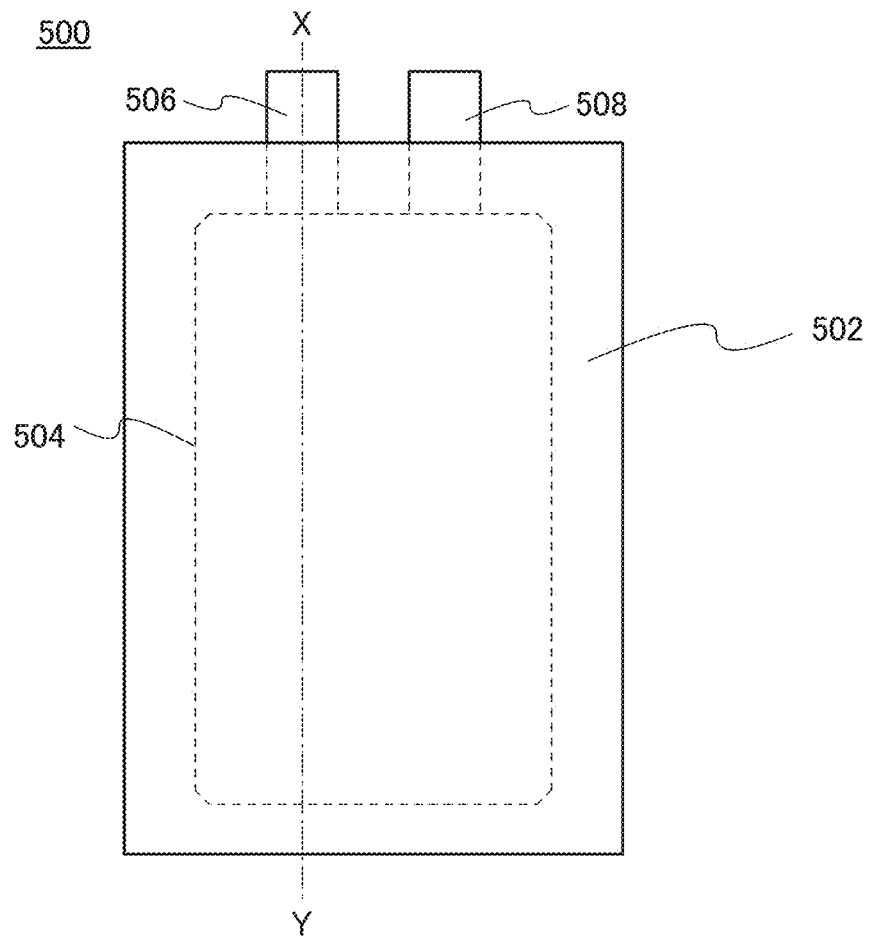
FIGS. 5A and 5B are a plan view and a cross-sectional view, respectively, illustrating one mode of a power storage device.
Figure 5B:
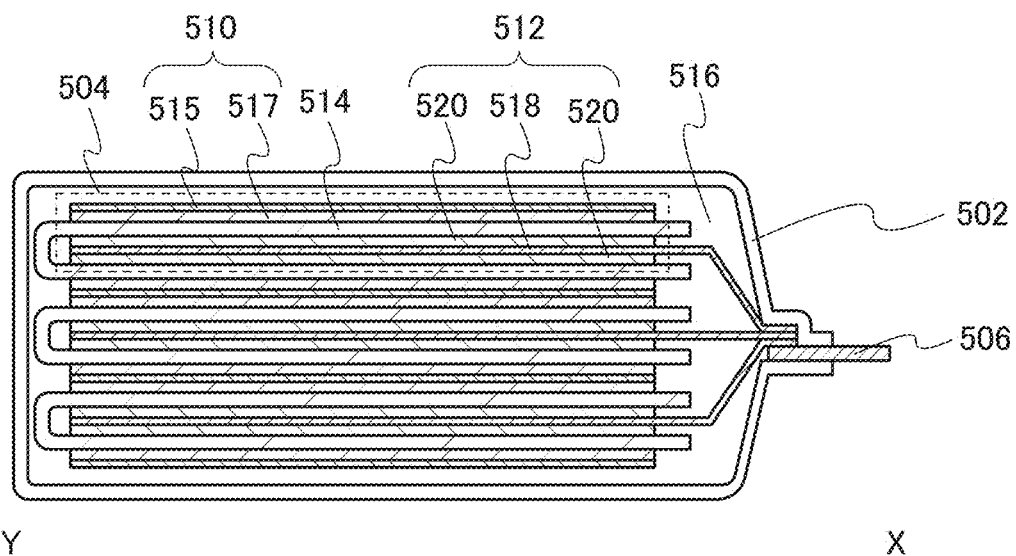

FIGS. 5A and 5B illustrate a structural example of a power storage device 500. FIG. 5B is a cross-sectional view along dashed dotted line X-Y in FIG. 5A.

The power storage device 500 illustrated in FIGS. 5A and 5B includes a power storage cell 504 in an exterior member 502. The power storage device 500 also includes terminal portions 506 and 508 connected to the power storage cell 504. The power storage cell 504 includes a negative electrode 510, a positive electrode 512, and a separator 514 provided between the negative electrode 510 and the positive electrode 512.

The power storage device 500 includes an electrolyte solution 516 with which a space between the exterior member 502, the power storage cell 504, and the separator 514 is filled. For the exterior member 502, a laminate film, a polymer film, a metal film, a metal case, a plastic case, or the like can be used.

The negative electrode 510 includes a negative electrode current collector 515 and a negative electrode active material layer 517. In this embodiment, the negative electrode active material layer 517 has been subjected to the aging treatment described in Embodiment 1. The negative electrode current collector 515 is connected to the terminal portion 508, and the terminal portion 508 partly extends outside the exterior member 502.

The positive electrode 512 includes a positive electrode current collector 518 and a positive electrode active material layer 520. In this embodiment, the positive electrode active material layer 520 is formed on one side or both sides of the positive electrode current collector 518. The positive electrode 512 may include a binder and a conductive additive besides the positive electrode current collector 518 and the positive electrode active material layer 520. The positive electrode current collector 518 is connected to the terminal portion 506. The terminal portion 506 partly extends outside the exterior member 502

Although a sealed thin power storage device is described as the power storage device 500 in this embodiment, the external shape of the power storage device 500 is not limited thereto. A power storage device having any of a variety of shapes, such as a button power storage device, a cylindrical power storage device, or a rectangular power storage device, can be used as the power storage device 500. In this embodiment, a structure in which a plurality of power storage cells 504 is stacked is employed for the power storage device 500, but the number of the power storage cells 504 used for the power storage device 500 may be one. Furthermore, one or more power storage cells 504 used for the power storage device 500 may be rolled.

For the positive electrode current collector 518, a conductive material such as aluminum or stainless steel which is processed into a foil shape, a plate shape, a net shape, or the like can be used. Alternatively, a conductive layer provided by deposition separately on a substrate and then separated from the substrate can be used as the positive electrode current collector 518.

The positive electrode active material layer 520 can be formed using any of $LiFeO_2$, $LiCoO_2$, $LiNiO_2$, $LiMn_2O_4$, $LiFePO_4$, $LiCoPO_4$, $LiNiPO_4$, $LiMnPO_4$, $V_2O_5$, $Cr_2O_5$, $MnO_2$, and other lithium compounds as a material. Note that when carrier ions are alkali metal ions other than lithium ions, alkaline earth metal ions, beryllium ions, or magnesium ions, the positive electrode active material layer 520 can be formed using, instead of lithium in the above lithium compounds, an alkali metal (e.g., sodium or potassium), an alkaline earth metal (e.g., calcium, strontium, or barium), beryllium, or magnesium.

The positive electrode active material layer 520 is formed over the positive electrode current collector 518 by a coating method or a physical vapor deposition method (e.g., a sputtering method), whereby the positive electrode 512 can be formed. In the case where a coating method is employed, the positive electrode active material layer 520 is formed in such a manner that a paste in which a conductive additive (for example, acetylene black (AB), a binder (e.g., polyvinylidene fluoride (PVDF)), or the like is mixed with any of the above materials for the positive electrode active material layer 520 is applied to the positive electrode current collector 518 and dried. In this case, the positive electrode active material layer 520 is preferably molded by applying pressure as needed.

Note that as the conductive additive, any electron-conductive material can be used as long as it does not cause a chemical change in the power storage device. For example, a carbon-based material such as graphite or carbon fibers; a metal material such as copper, nickel, aluminum, or silver; or a powder or fiber of a mixture thereof can be used.

As the binder, polysaccharides such as starch, carboxymethyl cellulose, hydroxypropyl cellulose, regenerated cellulose, and diacetyl cellulose; vinyl polymers such as polyvinyl chloride, polyvinyl pyrrolidone, polytetrafluoroethylene, polyvinylidene fluoride, polyethylene, polypropylene, polyvinyl alcohol, ethylene-propylene-diene monomer (EPDM) rubber, sulfonated EPDM rubber, styrene-butadiene rubber, butadiene rubber, and fluorine rubber; polyether such as polyethylene oxide; and the like can be given.

The positive electrode active material layer 520 may be formed using a paste of a mixture of the positive electrode active material and graphene instead of a conductive auxiliary agent and a binder. Note that an alkali metal such as potassium may be added to the graphene. Furthermore, the graphene can be obtained by producing graphene oxide through a Hummers method and performing reduction treatment.

The use of graphene instead of a conductive additive and a binder leads to a reduction in amount of the conductive additive and the binder in the positive electrode 512. In other words, the weight of the positive electrode 512 can be reduced; accordingly, the charge/discharge capacity of the lithium secondary battery per unit weight of the electrode can be increased.

Strictly speaking, the term "active material" refers only to a material that relates to intercalation and deintercalation of ions functioning as carriers. In this specification, however, in the case of employing a coating method to form the positive electrode active material layer 520, for the sake of convenience, the material of the positive electrode active material layer 520, that is, a substance that is actually a "positive electrode active material," a conductive additive, a binder, and the like are collectively referred to as the positive electrode active material layer 520.

As the negative electrode 510, the electrode subjected to the electrochemical aging treatment described in Embodiment 1 is used. In other words, the negative electrode current collector 515 of the negative electrode 510 corresponds to the current collector 303 described in Embodiment 1, and the negative electrode active material layer 517 of the negative electrode 510 corresponds to the active material layer 304 subjected to the aging treatment described in Embodiment 1.

Note that in the electrode illustrated in FIG. 3, the active material layer 304 is formed on only one surface of the current collector 303; however, the structure is not limited thereto, and the active material layer 304 may be formed on both surfaces of the current collector 303. For example, when the active material layer is formed using a silicon semiconductor, with the negative electrode current collector held by a frame-like susceptor in an LPCVD apparatus, the active material layer can be formed on both the surfaces of the negative electrode current collector at the same time. Accordingly, the number of manufacturing steps can be reduced in the case where both the surfaces of the negative electrode current collector are used for formation of the electrode.

The electrolyte solution 516 is, as described above, a non-aqueous solution containing an electrolyte or a solution containing an electrolyte. Particularly in a lithium secondary battery, an electrolyte containing lithium ions (carrier ions) is used. Examples of the electrolyte include lithium salt such as $LiClO_4$, $LiAsF_6$, $LiBF_4$, $LiPF_6$, or $Li(C_2F_5SO_2)_2N$. Note that when carrier ions are alkali metal ions other than lithium ions or alkaline earth metal ions, alkali metal salt (e.g., sodium salt or potassium salt), alkaline earth metal salt (e.g., calcium salt, strontium salt or barium salt), beryllium salt, magnesium salt, or the like can be used as a solute of the electrolyte solution 516.

The electrolyte solution 516 is preferably a nonaqueous solution containing an electrolyte. That is, as a solvent of the electrolyte solution 516, an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. Alternatively, as the aprotic organic solvent, one ionic liquid or a plurality of ionic liquids may be used. Owing to non-flammability and non-volatility of an ionic liquid, it is possible to suppress explosion, inflammation, and the like of the power storage device 500 at the time when the internal temperature of the power storage device 500 rises, resulting in improvement in safety.

When a gelled high-molecular material containing an electrolyte is used as the electrolyte solution 516, safety against liquid leakage and the like is improved and the power storage device 500 can be thinner and more lightweight. Examples of the gelled high-molecular material include a silicon gel, an acrylic gel, an acrylonitrile gel, polyethylene oxide, polypropylene oxide, and a fluorine-based polymer.

As the electrolyte solution 516, a solid electrolyte such as $Li_3PO_4$ can be used.

As the separator 514, an insulating porous material is used. For example, paper; nonwoven fabric; a glass fiber; ceramics; or a synthetic fiber such as nylon (polyamide), vinylon (polyvinyl alcohol based fiber), polyester, acrylic, polyolefin, or polyurethane may be used. Note that a material that does not dissolve in the electrolyte solution 516 should be selected.

A lithium secondary battery has a small memory effect, a high energy density, and a high charge/discharge capacity. In addition, the output voltage of the lithium secondary battery is high. Thus, it is possible to reduce the size and weight of the lithium-ion battery. Further, the lithium secondary battery does not easily deteriorate due to repeated charge/discharge cycles and can be used for a long time, leading to a reduction in cost.

In the case where the power storage device described in this embodiment is a lithium-ion capacitor, instead of the positive electrode active material layer 520, a material capable of reversibly inserting and extracting lithium ions and/or anions may be used. Examples of the material include active carbon, graphite, a conductive high molecule, and a polyacene organic semiconductor (PAS).

In a power storage device described in this embodiment, each of a positive electrode and a negative electrode has high adhesion between a current collector and an active material layer; accordingly, the electrodes can be bent. Thus, the power storage device can be flexible.

Note that this embodiment can be implemented in combination with any of the structures described in the other embodiments, as appropriate.

EMBODIMENT 4

The power storage device described in the above embodiment can be used for power supplies of a variety of electronic appliances which can be operated with power.

Specific examples of electronic appliances each utilizing the power storage device described in the above embodiment are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and medical electrical equipment such as dialyzers. In addition, moving objects driven by electric motors using power from power storage devices are also included in the category of electronic appliances. Examples of the moving objects include electric vehicles, hybrid vehicles each including both an internal-combustion engine and an electric motor, and motorized bicycles including motor-assisted bicycles.

In the electronic appliances, the power storage device described in the above embodiment can be used as a power storage device for supplying enough power for almost the whole power consumption (referred to as a main power supply). Alternatively, in the electronic appliances, the power storage device described in the above embodiment can be used as a power storage device which can supply power to the electronic appliances when the supply of power from the main power supply or a commercial power supply is stopped (such a power storage device is referred to as an uninterruptible power supply). Still alternatively, in the electronic appliances, the power storage device described in the above embodiment can be used as a power storage device for supplying power to the electronic appliances at the same time as the power supply from the main power supply or a commercial power supply (such a power storage device is referred to as an auxiliary power supply).

Figure 6:
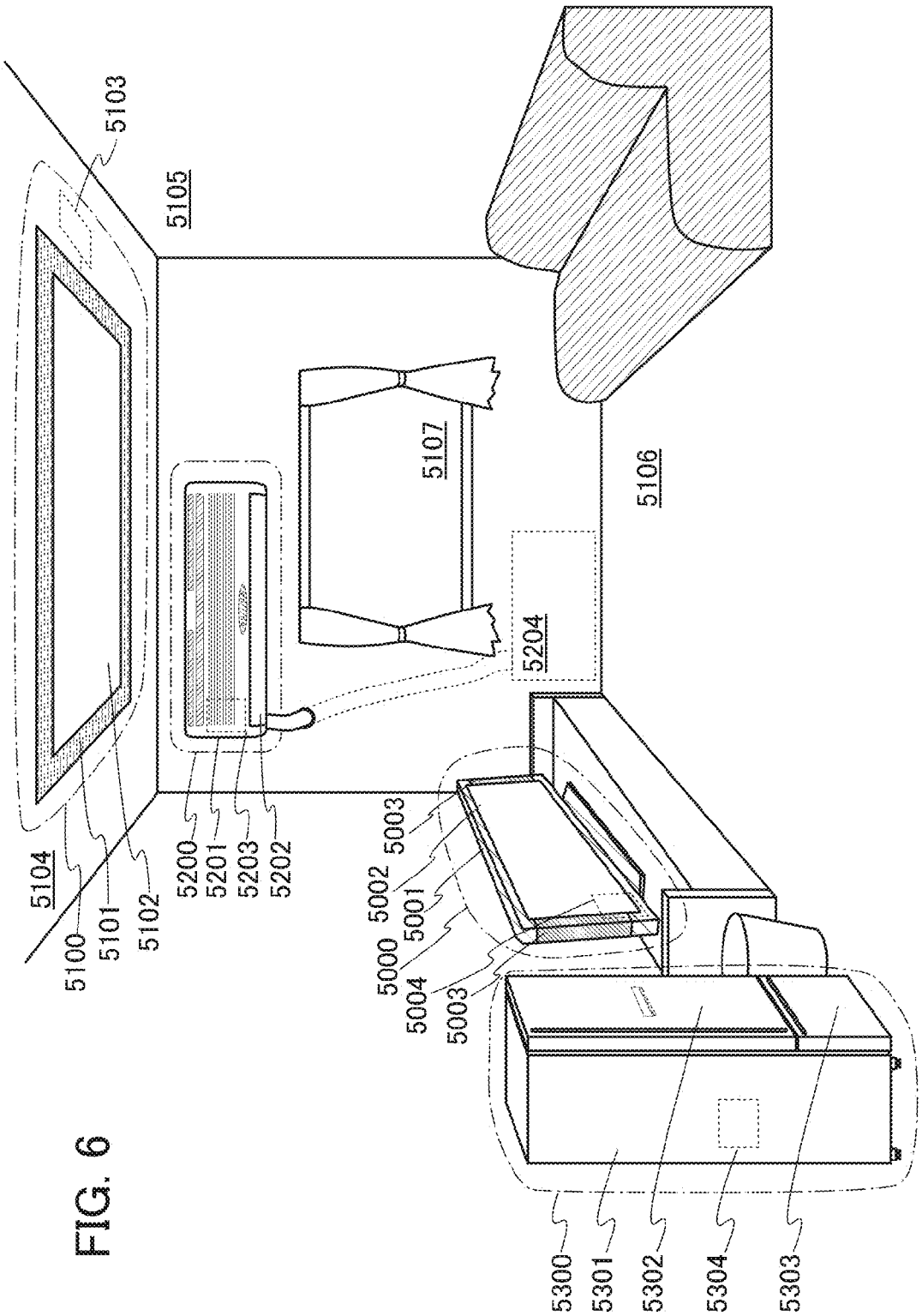
FIG. 6 shows application examples of a power storage device.

FIG. 6 illustrates specific structures of the electronic appliances. In FIG. 6, a display device 5000 is an example of an electronic appliance including the power storage device described in the above embodiment as a power storage device 5004. Specifically, the display device 5000 corresponds to a display device for TV broadcast reception and includes a housing 5001, a display portion 5002, speaker portions 5003, and the power storage device 5004. The power storage device 5004 is provided in the housing 5001. The display device 5000 can receive power from a commercial power supply. Alternatively, the display device 5000 can use power stored in the power storage device 5004. Thus, the display device 5000 can be operated with the use of the power storage device 5004 as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 6, an installation lighting device 5100 is an example of an electronic appliance including the power storage device described in the above embodiment as a power storage device 5103. Specifically, the lighting device 5100 includes a housing 5101, a light source 5102, and a power storage device 5103. Although FIG. 6 illustrates the case where the power storage device 5103 is provided in a ceiling 5104 on which the housing 5101 and the light source 5102 are installed, the power storage device 5103 may be provided in the housing 5101. The lighting device 5100 can receive power from a commercial power supply. Alternatively, the lighting device 5100 can use power stored in the power storage device 5103. Thus, the lighting device 5100 can be operated with the use of the power storage device 5103 as an uninterruptible power supply even when power cannot be supplied from a commercial power supply due to power failure or the like.

Note that although the installation lighting device 5100 provided in the ceiling 5104 is illustrated in FIG. 6 as an example, the power storage device described in the above embodiment can be used in an installation lighting device provided in, for example, a wall 5105, a floor 5106, a window 5107, or the like other than the ceiling 5104. Alternatively, the power storage device can be used in a tabletop lighting device or the like.

As the light source 5102, an artificial light source which emits light artificially by using power can be used. Specifically, examples of the artificial light source include an incandescent lamp, a discharge lamp such as a fluorescent lamp, and light-emitting elements such as an LED and an organic EL element.

In FIG. 6, an air conditioner including an indoor unit 5200 and an outdoor unit 5204 is an example of an electronic appliance including the power storage device described in the above embodiment as a power storage device 5203. Specifically, the indoor unit 5200 includes a housing 5201, an air outlet 5202, and a power storage device 5203. Although FIG. 6 illustrates the case where the power storage device 5203 is provided in the indoor unit 5200, the power storage device 5203 may be provided in the outdoor unit 5204. Alternatively, the power storage devices 5203 may be provided in both the indoor unit 5200 and the outdoor unit 5204. The air conditioner can receive power from a commercial power supply. Alternatively, the air conditioner can use power stored in the power storage device 5203. Particularly in the case where the power storage devices 5203 are provided in both the indoor unit 5200 and the outdoor unit 5204, the air conditioner can be operated with the use of the power storage device 5203 according to one embodiment of the present invention as an uninterruptible power supply even when power cannot be supplied from a commercial power supply due to power failure or the like.

Note that although the split-type air conditioner including the indoor unit and the outdoor unit is illustrated in FIG. 6 as an example, the power storage device described in the above embodiment can be used in an air conditioner in which the functions of an indoor unit and an outdoor unit are integrated in one housing.

In FIG. 6, an electric refrigerator-freezer 5300 is an example of an electronic appliance including the power storage device described in the above embodiment as a power storage device 5304. Specifically, the electric refrigerator-freezer 5300 includes a housing 5301, a door for a refrigerator 5302, a door for a freezer 5303, and the power storage device 5304. The power storage device 5304 is provided in the housing 5301 in FIG. 6. The electric refrigerator-freezer 5300 can receive power from a commercial power supply. Alternatively, the electric refrigerator-freezer 5300 can use power stored in the power storage device 5304. Thus, the electric refrigerator-freezer 5300 can be operated with the use of the power storage device 5304 as an uninterruptible power supply even when power cannot be supplied from a commercial power supply due to power failure or the like.

Note that among the electronic appliances described above, a high-frequency heating apparatus such as a microwave oven and an electronic appliance such as an electric rice cooker require high power in a short time. The tripping of a breaker of a commercial power supply in use of an electronic appliance can be prevented by using the power storage device described in the above embodiment as an auxiliary power supply for supplying power which cannot be supplied enough by a commercial power supply.

In addition, in a time period when electronic appliances are not used, particularly when the proportion of the amount of power which is actually used to the total amount of power which can be supplied from a commercial power supply source (such a proportion referred to as a usage rate of power) is low, power can be stored in the power storage device, whereby the usage rate of power can be reduced in a time period when the electronic appliances are used. For example, in the case of the electric refrigerator-freezer 5300, power can be stored in the power storage device 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the power storage device 5304 is used as an auxiliary power supply; thus, the usage rate of power in daytime can be reduced.

Next, a portable information terminal, which is an example of electronic appliances, is described with reference to FIGS. 7A to 7C.

Figure 7A:
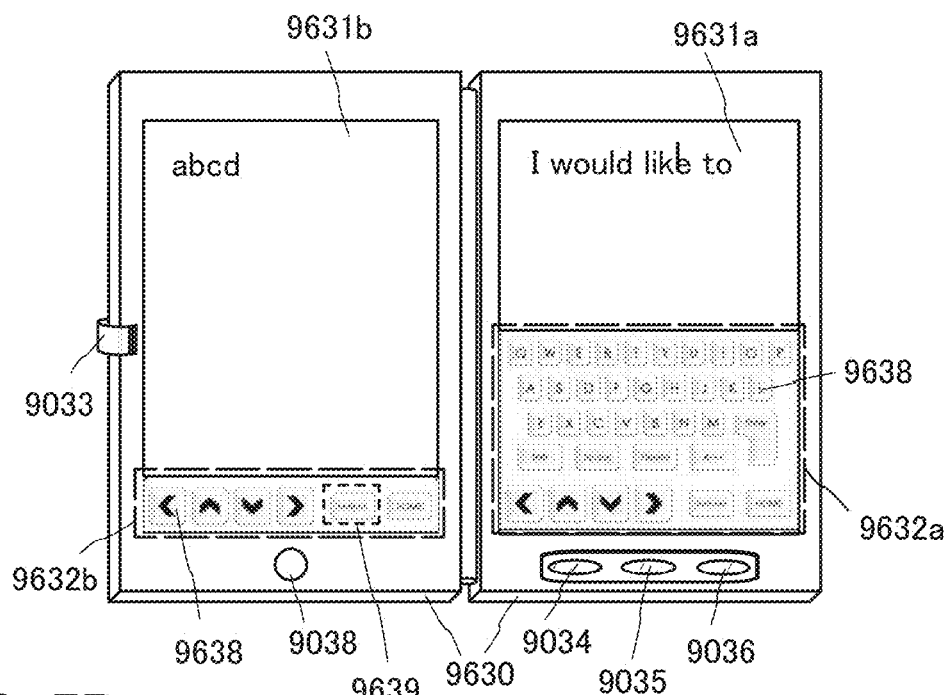
FIGS. 7A to 7C show an application example of a power storage device.
Figure 7B:
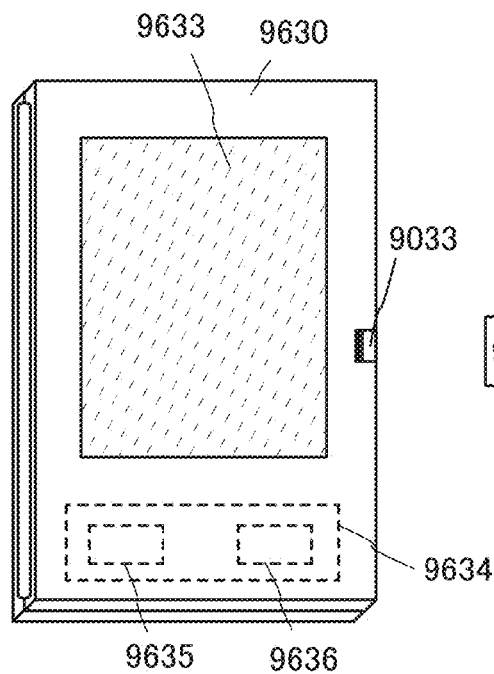

FIGS. 7A and 7B illustrate a tablet terminal that can be folded. In FIG. 7A, the tablet terminal is opened, and includes a housing 9630, a display portion 9631*a*, a display portion 9631*b*, a display-mode switching button 9034, a power button 9035, a power-saving-mode switching button 9036, a clip 9033, and an operation button 9038.

A touch panel area 9632*a* can be provided in a part of the display portion 9631*a*, in which area, data can be input by touching displayed operation keys 9638. Note that half of the display portion 9631*a* has only a display function and the other half has a touch panel function. However, an embodiment of the present invention is not limited to this structure, and the whole display portion 9631*a* may have a touch panel function. For example, a keyboard can be displayed on the whole display portion 9631*a* to be used as a touch panel, and the display portion 9631*b* can be used as a display screen.

A touch panel area 9632*b* can be provided in part of the display portion 9631*b* like in the display portion 9631*a*. When a keyboard display switching button 9639 displayed on the touch panel is touched with a finger, a stylus, or the like, a keyboard can be displayed on the display portion 9631*b*.

The touch panel area 9632*a* and the touch panel area 9632*b* can be controlled by touch input at the same time.

The display-mode switching button 9034 allows switching between a landscape mode and a portrait mode, color display and black-and-white display, and the like. The power-saving-mode switching button 9036 allows optimizing the display luminance in accordance with the amount of external light in use which is detected by an optical sensor incorporated in the tablet terminal. In addition to the optical sensor, another detecting device such as a sensor for detecting inclination, like a gyroscope or an acceleration sensor, may be incorporated in the tablet terminal.

Although the display portion 9631*a* and the display portion 9631*b* have the same display area in FIG. 7A, an embodiment of the present invention is not limited to this example. The display portion 9631a and the display portion 9631b may have different areas or different display quality. For example, higher definition images may be displayed on one of the display portions 9631a and 9631b.

FIG. 7B illustrates the tablet terminal folded, which includes the housing 9630, a solar battery 9633, a charge and discharge control circuit 9634, a battery 9635, and a DCDC converter 9636. Note that FIG. 7B shows an example in which the charge and discharge control circuit 9634 includes the battery 9635 and the DCDC converter 9636. The battery 9635 includes the power storage device described in the above embodiment.

Since the tablet terminal can be folded, the housing 9630 can be closed when not in use. Thus, the display portions 9631a and 9631b can be protected, which makes it possible to provide a tablet terminal with high durability and improved reliability for long-term use.

The tablet terminal illustrated in FIGS. 7A and 7B can have other functions such as a function of displaying various kinds of data (e.g., a still image, a moving image, and a text image), a function of displaying a calendar, a date, the time, or the like on the display portion, a touch-input function of operating or editing the data displayed on the display portion by touch input, and a function of controlling processing by various kinds of software (programs).

The solar battery 9633, which is attached on the surface of the tablet terminal, supplies electric power to a touch panel, a display portion, an image signal processor, and the like. Note that a structure in which the solar battery 9633 is provided on one or both surfaces of the housing 9630 is preferable because the battery 9635 can be charged efficiently. The use of the power storage device according to one embodiment of the present invention as the battery 9635 is advantageous in downsizing or the like.

The structure and operation of the charge and discharge control circuit 9634 illustrated in FIG. 7B are described with reference to a block diagram of FIG. 7C. FIG. 7C illustrates the solar battery 9633, the battery 9635, the DCDC converter 9636, a converter 9637, switches SW1 to SW3, and the display portion 9631. The battery 9635, the DCDC converter 9636, the converter 9637, and the switches SW1 to SW3 correspond to the charge and discharge control circuit 9634 in FIG. 7B.

First, description is made on an example of the operation in the case where power is generated by the solar battery 9633 using external light. The voltage of power generated by the solar battery 9633 is raised or lowered by the DCDC converter 9636 so that a voltage for charging the battery 9635 is obtained. When the display portion 9631 is operated with the power from the solar battery 9633, the switch SW1 is turned on and the voltage of the power is raised or lowered by the converter 9637 to a voltage needed for operating the display portion 9631. When display is not performed on the display portion 9631, the switch SW1 is turned off and the switch SW2 is turned on so that the battery 9635 can be charged.

Although the solar battery 9633 is shown as an example of a charge means, there is no particular limitation on the charge means and the battery 9635 may be charged with another means such as a piezoelectric element or a thermoelectric conversion element (Peltier element). For example, the battery 9635 may be charged with a non-contact power transmission module that transmits and receives power wirelessly (without contact) to charge the battery or with a combination of other charging means.

Figure 7C:
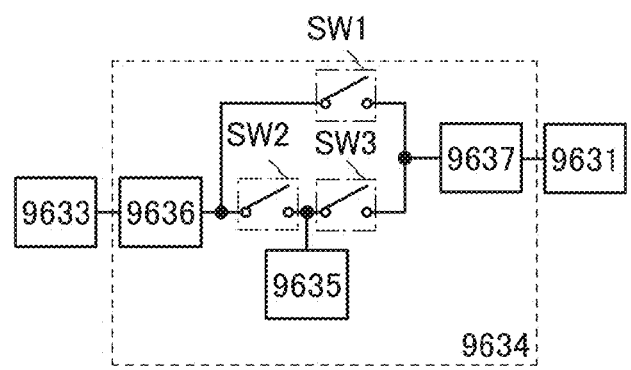

It is needless to say that an embodiment of the present invention is not limited to the electronic appliance illustrated in FIGS. 7A to 7C as long as the power storage device described in the above embodiment is included.

Note that this embodiment can be implemented in combination with any of the structures described in other embodiments, as appropriate.

EXAMPLE 1

Figure 8:
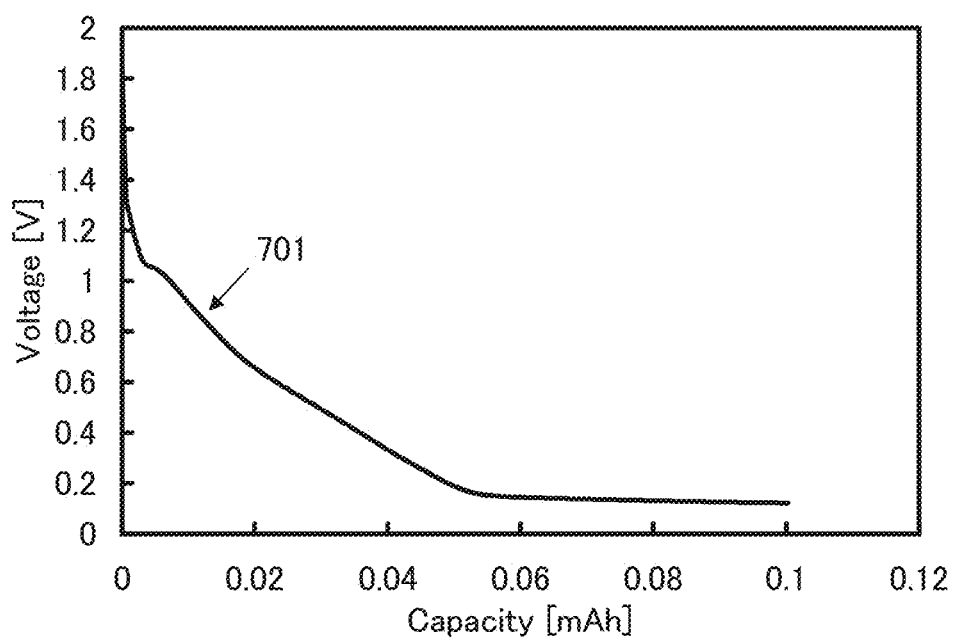
FIG. 8 shows a condition of electrochemical aging treatment.
Figure 9A:
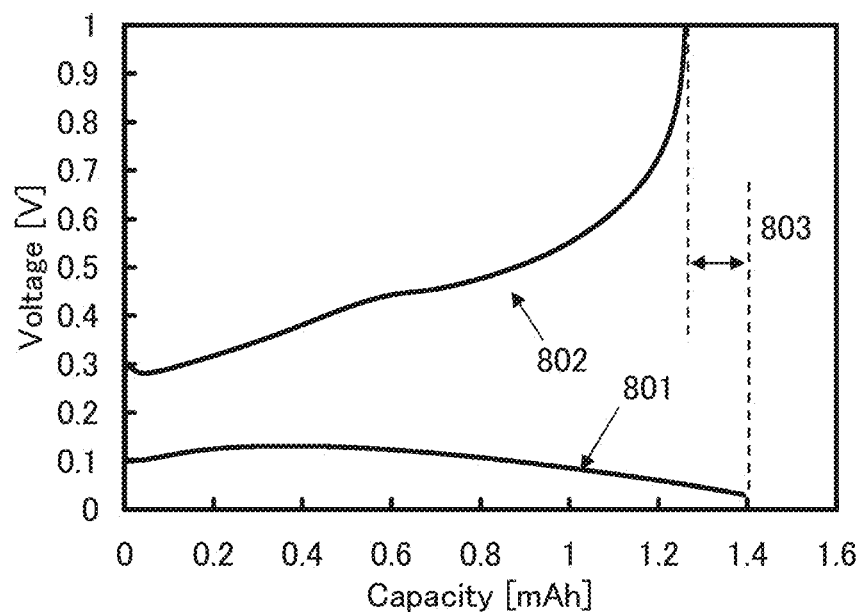
FIGS. 9A and 9B each show a comparative condition of the electrochemical aging treatment.
Figure 9B:
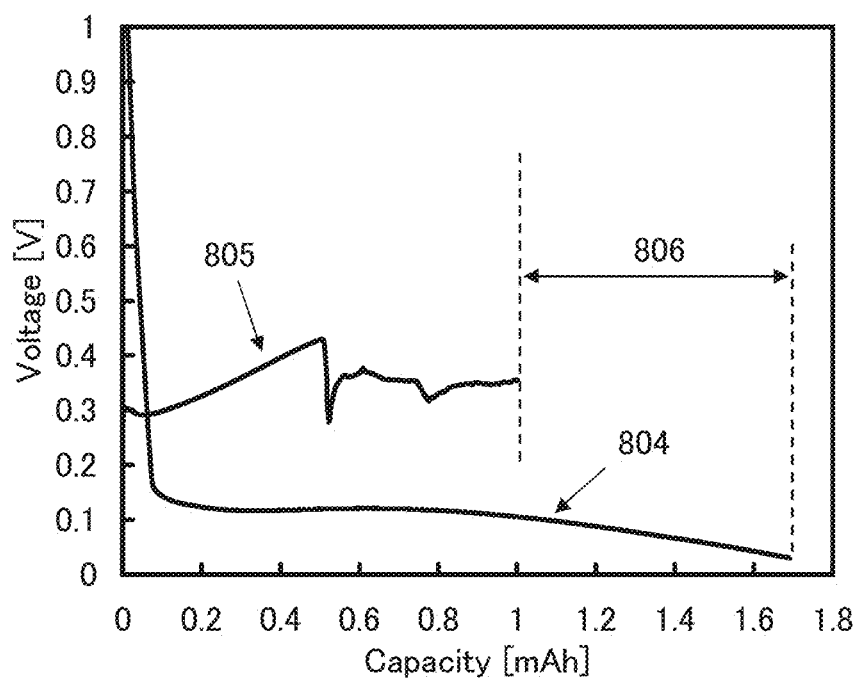
Figure 10:
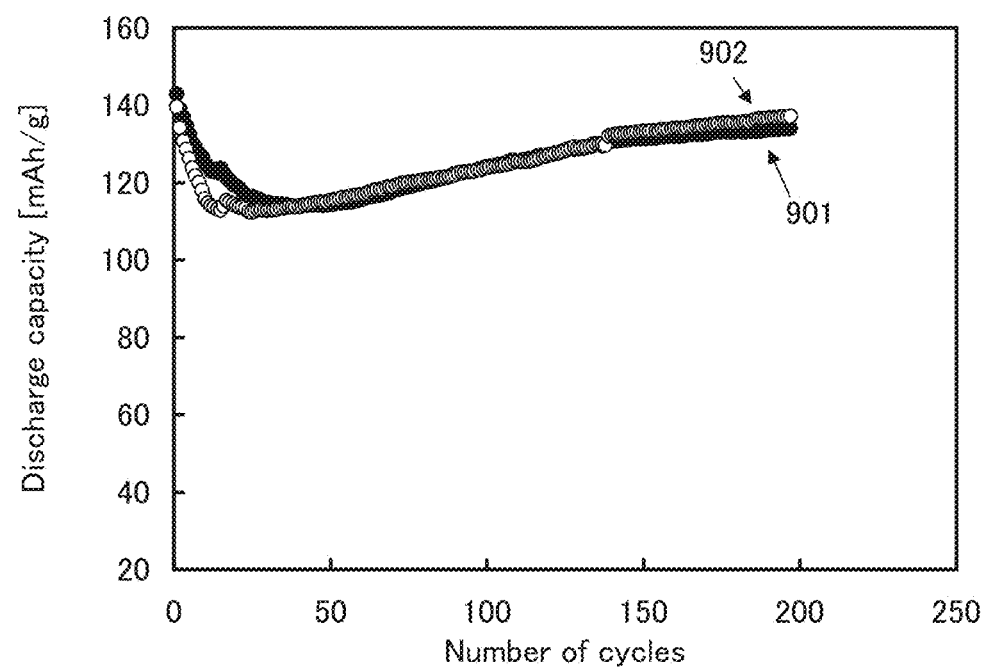
FIG. 10 shows cycle performance.

In this example, the specific conditions of electrochemical aging (Electrochemical Aging Conditions 1 and 2) are described with reference to FIG. 8, FIGS. 9A and 9B, and FIG. 10. FIG. 8 is a graph showing Electrochemical Aging Condition 1. FIGS. 9A and 9B are graphs showing Electrochemical Aging Condition 2 and Electrochemical Aging Condition 3, respectively. In FIG. 10, the cycle performance of a lithium secondary battery using a negative electrode subjected to aging treatment under Electrochemical Aging Condition 1 is compared to that of a lithium secondary battery using a negative electrode subjected to aging treatment under Electrochemical Aging Condition 2.

In each of the aging treatment under Electrochemical Aging Conditions 1 to 3 described below, the active material layer including a plurality of whisker-like portions, which is formed of silicon and described in Embodiment 2, was used as an object of the aging. The active material layer was formed on a titanium sheet functioning as a current collector, and these were used as a positive electrode of a cell for aging. In each of the conditions, metal lithium was used for a counter electrode (a negative electrode in the cell for aging). An electrolyte solution in which $LiPF_6$ was dissolved in a mixed solvent of ethylene carbonate (EC) and diethyl carbonate (DEC) was used. As the separator, polypropylene (PP) was used. These were put in a cell for charge-discharge measurement (HS Test Cell produced by Hohsen Corp.). The charge-discharge rate was 0.2 C.

(Electrochemical Aging Condition 1)

FIG. 8 shows Electrochemical Aging Condition 1. The horizontal axis indicates capacity (mAh). The vertical axis indicates voltage (V). As a curve 701 shows, in Electrochemical Aging Condition 1, lithium corresponding to a capacity of 0.10 mAh was inserted into an electrode to be a negative electrode of a secondary battery. The amount of lithium inserted here corresponds to about 7% of the total capacity, which is the amount of lithium used for the irreversible capacity of the negative electrode. As seen from FIG. 8, just after insertion of lithium into the electrode, the voltage is 1 V or higher. This is probably because lithium was mainly used for forming a film at the surface of the electrode. Therefore, silicon and lithium hardly reacted with each other. When lithium corresponding to a capacity of 0.10 mAh of was inserted, the voltage was about 0.12 V.

(Electrochemical Aging Condition 2)

FIG. 9A shows Electrochemical Aging Condition 2. The horizontal axis indicates capacity (mAh). The vertical axis indicates voltage (V). As a curve 801 shows, in Electrochemical Aging Condition 2, first, an approximately maximum amount of lithium was inserted into an electrode to be a negative electrode of a secondary battery. In the graph, the capacity increases from left to right as insertion of lithium proceeds. When the charge-discharge rate was set at 0.2 C, the insertion of lithium into the negative electrode was performed such that the potential difference between the negative electrode and the counter electrode was greater than or equal to 0.03 V and less than or equal to 0.2 V. After that, as a curve 802 shows, aging treatment was performed such that lithium corresponding to a capacity of 0.13 mAh was made to remain and the other lithium was extracted. In FIG. 9A, a zone 803 indicated by dotted lines shows the capacity of 0.13 mAh. This means that lithium corresponding to about 9% of the total capacity was made to remain.

(Electrochemical Aging Condition 3)

FIG. 9B shows Electrochemical Aging Condition 3. The horizontal axis indicates capacity (mAh). The vertical axis indicates voltage (V). As a curve 804 shows, in Electrochemical Aging Condition 3, first, an approximately maximum amount of lithium was inserted into an electrode to be a negative electrode of a secondary battery as in Electrochemical Aging Condition 2. When the charge-discharge rate is set at 0.2 C, the insertion of lithium into the negative electrode was performed such that a potential difference between the negative electrode and the counter electrode was greater than or equal to 0.03 V and less than or equal to 0.2 V. Next, as a curve 805 shows, lithium was extracted as aging treatment. Here, lithium was extracted such that lithium corresponding to a capacity of 0.76 mAh shown by a zone 806 was made to remain, which is different from Electrochemical Aging Condition 2. This amount corresponds to about 43% of the total capacity.

(Evaluation of Electrochemical Aging Treatment)

FIG. 4 shows the results of measuring cycle life of a lithium secondary battery in which an electrode subjected to electrochemical aging treatment. As shown by the curve 401 showing the cycle performance of the secondary battery which is not subjected to the electrochemical aging treatment, the capacity decreases with an increase in the number of cycles; that is, the cycle performance deteriorates. On the other hand, the curve 402 shows the cycle performance of the lithium secondary battery provided with the electrode subjected to the aging treatment under Electrochemical Aging Condition 2. Although the capacity slightly decreases in the initial period of the cycles, the capacity does not fall below the dotted line 404 that denotes a decrease by 20% or more from the total capacity. After 50 or more charge-discharge cycles are performed, there is no reduction in capacity with an increase in the number of cycles; on the contrary, the capacity increases to a value close to the initial value.

In FIG. 4, the curve 403 shows the cycle performance of a lithium secondary battery in which an electrode subjected to the aging treatment under Electrochemical Aging Condition 1 is used as a negative electrode. With repetition of charge and discharge, the capacity decreases. This indicates that even when lithium corresponding to irreversible capacity of the negative electrode is inserted into the negative electrode by an electrochemical method in advance, the cycle performance of the lithium secondary battery in which an alloy-based material such as silicon is used as an active material is not improved.

In FIG. 10, the cycle performance of the lithium secondary battery provided with the negative electrode subjected to treatment under Electrochemical Aging Condition 2 is compared to the cycle performance of the lithium secondary battery provided with the negative electrode subjected to treatment under Electrochemical Aging Condition 3. The horizontal axis indicates the number of cycles, and the vertical axis indicates change in discharge capacity (mAh/g). A curve 901 shows the result of the electrode subjected to the aging treatment under Electrochemical Aging Condition 2, and a curve 902 shows the result of the electrode subjected to the aging treatment under Electrochemical Aging Condition 3. The curve 901 and the curve 902 almost overlap with each other, and there is no deterioration in capacity with an increase in the number of cycles in either case. Therefore, the cycle performance of the negative electrode was improved under each of Electrochemical Aging Conditions 2 and 3.

According to the above results, electrochemical aging treatment is performed on an active material for forming a negative electrode, and then the negative electrode is provided in a lithium secondary battery, so that the deterioration in the cycle performance of the negative electrode is significantly prevented. In particular, lithium is inserted into an alloy-based material serving as the active material for forming the negative electrode, and then the lithium is extracted, so that the deterioration in the cycle performance of the negative electrode is significantly prevented. Therefore, by performing electrochemical aging treatment in which lithium is inserted and extracted on an electrode to be a negative electrode before a battery is assembled, the reactivity between lithium and an alloy-based material serving as an active material for forming the negative electrode is improved.

EXPLANATION OF REFERENCE

101a: the first charge, 101b: the second charge, 102a: the first discharge, 102b: the second discharge, 201a: the first charge, 201b: the second charge, 202a: the first discharge, 202b: the second discharge, 300: cell for aging, 301: container, 302: electrolyte solution, 303: current collector, 304: active material layer, 305: electrode, 306: counter electrode, 307: separator, 401: curve, 402: curve, 403: curve, 404: dotted line denoting a decrease by 20% or more from the total capacity, 500: power storage device, 502: exterior member, 504: power storage cell, 506: terminal portion, 508: terminal portion, 510: negative electrode, 512: positive electrode, 514: separator, 515: negative electrode current collector, 516: electrolyte solution, 517: negative electrode active material layer, 518: positive electrode current collector, 520: positive electrode active material layer, 701: curve, 801: curve, 802: curve, 803: zone, 804: curve, 805: curve, 806: capacity, 901: curve, 902: curve, 5000: display device, 5001: housing, 5002: display portion, 5003: speaker portion, 5004: power storage device, 5100: lighting device, 5101: housing, 5102: light source, 5103: power storage device, 5104: ceiling, 5105: wall, 5106: floor, 5107: window, 5200: indoor unit, 5201: housing, 5202: ventilation duct, 5203: power storage device, 5204: outdoor unit, 5300: electric refrigerator-freezer, 5301: housing, 5302: door for a refrigerator, 5303: door for a freezer, 5304: power storage device, 9033: clip, 9034: display-mode switching button, 9035: power supply switch, 9036: power-saving-mode switching button, 9038: operation switch, 9630: housing, 9631: display portion, 9631a: display portion, 9631b: display portion, 9632a: region, 9632b: region, 9633: solar cell, 9634: charge and discharge control circuit, 9635: battery, 9636: DC-DC converter, 9637: converter, 9638: operation key, 9639: keyboard display switching button This application is based on Japanese Patent Application serial no. 2011-205100 filed with Japan Patent Office on Sep. 20, 2011, the entire contents of which are hereby incorporated by reference.

The invention claimed is:

1. A method of manufacturing a lithium secondary battery, comprising the steps of:
   forming a negative electrode comprising an active material layer over a current collector, the active material layer comprising a plurality of whisker-like portions;
   after the forming step, electrochemically inserting lithium into the negative electrode with use of a counter electrode,
   after the inserting step, electrochemically extracting a part of the lithium inserted into the negative electrode, and after the extracting step, assembling the lithium secondary battery comprising the negative electrode, wherein each of the plurality of whisker-like portions consists of silicon, and wherein a remained lithium in the negative electrode after the extracting step is greater than or equal to 9% and less than or equal to 43% of a total capacity of the negative electrode.

2. The method of manufacturing a lithium secondary battery, according to claim 1, wherein the inserting step is performed with a potential difference between the negative electrode and the counter electrode of greater than or equal to 0.03 V and less than or equal to 0.2 V at a charge-discharge rate of 0.2 C.

3. The method of manufacturing a lithium secondary battery, according to claim 1, wherein an approximately maximum amount of lithium is inserted into the negative electrode in the inserting step.

4. The method of manufacturing a lithium secondary battery, according to claim 1, wherein the counter electrode is made of lithium.

5. The method of manufacturing a lithium secondary battery, according to claim 1, wherein the lithium secondary battery is incorporated into any of a display device, a lighting device, a desktop personal computer, a laptop personal computer, an image reproduction device, a mobile phone, a portable game machine, a portable information terminal, an e-book reader, a video camera, a digital still camera, a high-frequency heating appliance, an electric rice cooker, an electric washing machine, an air conditioner, an electric refrigerator, an electric freezer, an electric refrigerator-freezer, a freezer for preserving DNA, and a medical electrical equipment.

6. A method of manufacturing a lithium secondary battery, comprising the steps of:

forming a negative electrode comprising an active material layer over a current collector, the active material layer comprising a plurality of whisker-like portions;

after the forming step, electrochemically inserting lithium into the negative electrode with use of a counter electrode, after the inserting step, electrochemically extracting a part of the lithium inserted into the negative electrode, and after the extracting step, assembling the lithium secondary battery comprising the negative electrode, a positive electrode, and an electrolyte solution, wherein each of the plurality of whisker-like portions consists of silicon, and wherein a remained lithium in the negative electrode after the extracting step is greater than or equal to 9% and less than or equal to 43% of a total capacity of the negative electrode.

7. The method of manufacturing a lithium secondary battery, according to claim 6, wherein the inserting step is performed with a potential difference between the negative electrode and the counter electrode of greater than or equal to 0.03 V and less than or equal to 0.2 V at a charge-discharge rate of 0.2 C.

8. The method of manufacturing a lithium secondary battery, according to claim 6, wherein an approximately maximum amount of lithium is inserted into the negative electrode in the inserting step.

9. The method of manufacturing a lithium secondary battery, according to claim 6, wherein the counter electrode is made of lithium.

10. The method of manufacturing a lithium secondary battery, according to claim 6, wherein the lithium secondary battery is incorporated into any of a display device, a lighting device, a desktop personal computer, a laptop personal computer, an image reproduction device, a mobile phone, a portable game machine, a portable information terminal, an e-book reader, a video camera, a digital still camera, a high-frequency heating appliance, an electric rice cooker, an electric washing machine, an air conditioner, an electric refrigerator, an electric freezer, an electric refrigerator-freezer, a freezer for preserving DNA, and a medical electrical equipment.

11. A method of manufacturing a lithium secondary battery, comprising the steps of:

forming an active material layer over a current collector by an LPCVD method, the active material layer comprising a plurality of whisker-like portions;

after forming the active material layer, forming graphene over and in contact with the plurality of whisker-like portions so as to form a negative electrode;

after forming graphene, electrochemically inserting lithium into the negative electrode with use of a counter electrode, after the inserting step, electrochemically extracting a part of the lithium inserted into the negative electrode, and after the extracting step, assembling the lithium secondary battery comprising the negative electrode, wherein each of the plurality of whisker-like portions is formed of silicon, and wherein a remained lithium in the negative electrode after the extracting step is greater than or equal to 9% and less than or equal to 43% of a total capacity of the negative electrode.

12. The method of manufacturing a lithium secondary battery, according to claim 11, wherein the inserting step is performed with a potential difference between the negative electrode and the counter electrode of greater than or equal to 0.03 V and less than or equal to 0.2 V at a charge-discharge rate of 0.2 C.

13. The method of manufacturing a lithium secondary battery, according to claim 11, wherein an approximately maximum amount of lithium is inserted into the negative electrode in the inserting step.

14. The method of manufacturing a lithium secondary battery, according to claim 11, wherein the counter electrode is made of lithium.

15. The method of manufacturing a lithium secondary battery, according to claim 11, wherein the lithium secondary battery is incorporated into any of a display device, a lighting device, a desktop personal computer, a laptop personal computer, an image reproduction device, a mobile phone, a portable game machine, a portable information terminal, an e-book reader, a video camera, a digital still camera, a high-frequency heating appliance, an electric rice cooker, an electric washing machine, an air conditioner, an electric refrigerator, an electric freezer, an electric refrigerator-freezer, a freezer for preserving DNA, and a medical electrical equipment.

16. The method of manufacturing a lithium secondary battery according to claim 1, further comprising the steps of:

forming a graphene oxide over the plurality of whisker-like portions, and performing a reduction treatment to the graphene oxide to release a part of oxygen from the graphene oxide.

17. The method of manufacturing a lithium secondary battery according to claim 16, wherein the graphene oxide is formed using an electrophoresis method.

18. The method of manufacturing a lithium secondary battery according to claim 6, further comprising the steps of:
   forming a graphene oxide over the plurality of whisker-like portions, and
   performing a reduction treatment to the graphene oxide to release a part of oxygen from the graphene oxide.

19. The method of manufacturing a lithium secondary battery according to claim 18, wherein the graphene oxide is formed using an electrophoresis method.

20. The method of manufacturing a lithium secondary battery according to claim 1, wherein the active material layer consists of silicon by the forming step.

21. The method of manufacturing a lithium secondary battery according to claim 6, wherein the active material layer consists essentially of consists of silicon by the forming step.

22. The method of manufacturing a lithium secondary battery according to claim 11, wherein the active material layer is formed of silicon by forming the active material layer.

23. The method of manufacturing a lithium secondary battery according to claim 1, wherein at least one of the plurality of whisker-like portions comprises crystalline silicon core.

24. The method of manufacturing a lithium secondary battery according to claim 6, wherein at least one of the plurality of whisker-like portions comprises crystalline silicon core.

25. The method of manufacturing a lithium secondary battery according to claim 11, wherein at least one of the plurality of whisker-like portions comprises crystalline silicon core.

* * * * *